(12) United States Patent
Benting et al.

(10) Patent No.: US 9,143,248 B2
(45) Date of Patent: Sep. 22, 2015

(54) TARGETED CONTENT STREAMING AND RECEPTION SYSTEM

(75) Inventors: Steve Benting, Sausalito, CA (US); Alain Delpuch, Les Essarts le Roi (FR); Nick Fishwick, San Francisco, CA (US); Mehmet Hakan Isbiliroglu, Sunnyvale, CA (US); Vahid Koussari-Amin, San Francisco, CA (US); Waiman Lam, Sammamish, WA (US); Jean-Rene Menand, Los Altos, CA (US); Steven Szymanski, Mountain View, CA (US); Pierre Willard, Palo Alto, CA (US); Joel Zdepski, Mountain View, CA (US)

(73) Assignee: OpenTV, Inc., San Francisco, CA (US)

( * ) Notice: Subject to any disclaimer, the term of this patent is extended or adjusted under 35 U.S.C. 154(b) by 1450 days.

(21) Appl. No.: 10/928,727

(22) Filed: Aug. 30, 2004

(65) Prior Publication Data

US 2005/0078677 A1    Apr. 14, 2005

Related U.S. Application Data

(60) Provisional application No. 60/498,575, filed on Aug. 29, 2003.

(51) Int. Cl.
*H04N 7/10* (2006.01)
*H04N 7/025* (2006.01)
(Continued)

(52) U.S. Cl.
CPC .......... *H04H 60/15* (2013.01); *H04L 65/4076* (2013.01); *H04H 20/16* (2013.01); *H04H 2201/70* (2013.01); *H04L 12/1895* (2013.01); *H04L 12/587* (2013.01); *H04N 21/4856* (2013.01)

(58) Field of Classification Search
CPC ... H04N 60/25; H04N 7/188; H04N 21/4856; G06F 8/65
USPC .............................................. 370/390; 725/31
See application file for complete search history.

(56) References Cited

U.S. PATENT DOCUMENTS 5,260,778 A * 11/1993 Kauffman et al. ............... 725/33
5,448,568 A *  9/1995 Delpuch et al. ............. 348/423.1
(Continued)

FOREIGN PATENT DOCUMENTS

EP    1388993 A1    2/2004
JP   02256280 A2   10/1990
(Continued)

OTHER PUBLICATIONS

"Application Serial No. 04782426.3, Supplemental European Search Report Mailed Oct. 31, 2008", 5 pgs.
(Continued)

*Primary Examiner* — Nathan Flynn
*Assistant Examiner* — James R Marandi
(74) *Attorney, Agent, or Firm* — Schwegman Lundberg & Woessner, P.A.

(57) ABSTRACT

This invention relates to methods and systems for the broadcast and reception of targeted content. Using the systems and methods, a wide variety of different types of content can be targeted to a single client or a group of clients. The methods and systems utilize application handlers to handle different types of content. Further, the system can distribute packets with different rates depending on their priority.

14 Claims, 3 Drawing Sheets

(51) Int. Cl.
  H04N 7/173    (2011.01)
  H04H 60/15    (2008.01)
  H04L 29/06    (2006.01)
  H04N 21/485   (2011.01)
  H04H 20/16    (2008.01)
  H04L 12/18    (2006.01)
  H04L 12/58    (2006.01)

(56) References Cited

U.S. PATENT DOCUMENTS

| | | | |
|---|---|---|---|
| 5,515,098 A * | 5/1996 | Carles | 725/35 |
| 6,157,719 A | 12/2000 | Wasilewski et al. | |
| 6,172,988 B1 * | 1/2001 | Tiernan et al. | 370/473 |
| 6,308,202 B1 * | 10/2001 | Cohn et al. | 709/217 |
| 6,463,585 B1 * | 10/2002 | Hendricks et al. | 725/35 |
| 6,493,876 B1 * | 12/2002 | DeFreese et al. | 725/100 |
| 6,853,728 B1 | 2/2005 | Kahn et al. | |
| 7,577,979 B2 * | 8/2009 | Feinleib et al. | 725/114 |
| 2001/0023429 A1 * | 9/2001 | Barker et al. | 709/203 |
| 2002/0124182 A1 * | 9/2002 | Bacso et al. | 713/200 |
| 2002/0138849 A1 * | 9/2002 | Blackketter et al. | 725/113 |
| 2002/0162115 A1 * | 10/2002 | Bruckner et al. | 725/105 |
| 2003/0009763 A1 | 1/2003 | Crinon et al. | |
| 2005/0005306 A1 | 1/2005 | Kim et al. | |

FOREIGN PATENT DOCUMENTS

| | | |
|---|---|---|
| JP | 200154082 A | 2/2001 |
| JP | 2003179580 A2 | 6/2003 |
| JP | 2003204343 A2 | 7/2003 |
| JP | 2003209759 A | 7/2003 |
| JP | 2003233597 A2 | 8/2003 |
| JP | 2003242402 A2 | 8/2003 |
| WO | WO-0105152 A1 | 1/2001 |
| WO | WO-0189154 A1 | 11/2001 |
| WO | WO-0219621 A2 | 3/2002 |
| WO | WO-2005022344 A2 | 3/2005 |
| WO | WO-2005022344 A3 | 3/2005 |

OTHER PUBLICATIONS

"Digital Video Broadcasting (DVB) ; Globally Executable MHP (GEM) Specification 1.0.0; ETSI TS 102 819", ETSI Standards, LIS, Sophia Antipolis Cedex, France, vol. BC , (No. V1.1.1), XP014007006 ISSN : 0000':'0001, (Jan. 1, 2003), 17-20 pgs.

"Digital Video Broadcasting (DVB); Implementation guidelines for Data Broadcasting ; ETSI TR 101 202", ETSI Standards, LIS, Sophia Antipolis Cedex, France, vol. BC, (No. V1.2 .1), XP014004800 ISSN: 0000-0001, (Jan. 1, 2003), 9-25 pgs.

"Digital Video Broadcasting (DVB); Specification for System Software Update in DVB Systems; ETSI TS 102 006", ETSI Standards , LIS, Sophia Antipolis Cedex, France, vol. BC, (No. V1.2.1), XP014006875 ISSN: 0000-0001, (Oct. 1, 2002), 9-30 pgs.

"International Application Serial No. PCT/2004/027944, International Search Report mailed Mar. 24, 2005", 1 pg.

"International Application Serial No. PCT/US2004/027944, Written Opinion mailed Mar. 24, 2005", 3 pgs.

Galbraith, R., "Standards for Broadband Customer Premises Equipment", BT Technology Journal, Kluwer Academic Publishers, Do, vol. 20, (No. 2), XP019218752 ISSN: 1573-1995, (Apr. 1, 2002), 82-86 pgs.

"Australian Application No. 2004269720 Examiiner's report mailed Feb. 2, 2009", 2 pgs.

04782426.3, "European application No. 04782426.3 office action mailed Mar. 10, 2009", 6.

2006-524892, "Application Serial No. 2006-524892 Office Action Mailed Aug. 4, 2009", 4 pgs.

"Australian Application Serial No. 2004269720, Response filed May 21, 2009 to Examiner's Report mailed Feb. 2, 2009", 3 pgs.

"Australian Application Serial No. 2004269720, Response filed Dec. 24, 2008 to Examiner's Report mailed Sep. 13, 2007", 10 pgs.

"Australian Application Serial No. 2004269720, First Examiner's Report mailed Sep. 13, 2007", 4 pgs.

"European Application Serial No. 04782426.3, Office Action mailed Oct. 3, 2009", 6 pgs.

"European Application Serial No. 04782426.3, Response filed Dec. 23, 2009", 12 pgs.

"European Application Serial No. 11157451.3, Office Action mailed Jun. 6, 2012", 5 pgs.

"International Application Serial No. PCT/US2004/027944, International Preliminary Report on Patentability mailed Mar. 9, 2006", 2 pgs.

"Japanese Application Serial No. 2006-524892, Amendment Filed Mar. 21, 2012", 10 pgs.

"Japanese Application Serial No. 2006-524892, Amendment filed Apr. 30, 2010", 18 pgs.

"Japanese Application Serial No. 2006-524892, Notice of Allowance mailed Apr. 10, 2012", 2 pgs.

"Japanese Application Serial No. 2010-105782, Office Action mailed Apr. 24, 2012", with English translation of claims., 4 pgs.

"Japanese Application Serial No. 2010-105782, Office Action mailed Sep. 11, 2012", JP Office Action Only, 2 pgs.

"Japanese Application Serial No. 2010-105782, Response filed Aug. 24, 2012 to Office Action mailed", 6 pgs.

Cullen, Terry, "Beef Up Your Browser: Using Helper Applications and Plug-ins", [Online]. Retrieved from the Internet: <http://www.aallnet.org/main-menu/Publications/spectrum/Archives/Vol-1/pub_sp9707/pub-sp9707-browser.pdf>, (Jul. 1, 1997), 4 pgs.

"European Application Serial No. 04782426.3, Communication Regarding Letter dated Feb. 4, 2014 Withdrawing Opposition mailed Feb. 10, 2014", 2 pgs.

"European Application Serial No. 04782426.3, Notice of Opposition filed Jan. 17, 2014", 24 pgs.

"Japanese Application Serial No. 2010-105782, Office Action mailed Jun. 10, 2014", in English, 2 pgs.

"Japanese Application Serial No. 2010-105782, Response filed Jun. 17, 2014 to Office Action mailed Jun. 10, 2014", 4 pgs.

"European Application Serial No. Communication of a Notice of Opposition mailed Jan. 27, 2014", 1 pg.

"How Qos Works", [Online]. Retrieved from the Internet: <URL: http://technet.microsoft.com/en-us/library/cc728211(v=WS.10).aspx>, (Updated Mar. 28, 2003), 12 pgs.

"Japanese Application Serial No. 2010-105782, Office Action mailed May 20, 2013", with English translation of claim, 4 pgs.

"Japanese Application U.S. Appl. No. 2010-105782, Response filed Mar. 8, 2013", 7 pgs.

"Patent Assignment Abstract of Title", [Online]. Retrieved from the Internet: <URL: http://assignments.uspto.gov/assignments/q?db=pat&qt=pub&reel=&frame=&pat . . . >, (Accessed Dec. 17, 2013), 1 pg.

Barbir, A, et al., "Known Content Network (CN) Request-Routing Mechanisms", The Internet Society 2003, (Jul. 2003), 20 pgs.

Hossain, Ekram, et al., "Link-Level Traffic Scheduling for Providing Predicitive QoS in Wireless Multimedia Networks", 2004 IEEE Transactions on Multimedia, vol. 6, No. 1, (Feb. 2004), 199-217.

Plummer, David C, "An Ethernet Address Resolution Protocol or Converting Network Protocol Addresses to 48 bit Ethernet Address for Transmission of Ethernet Hardware", (Nov. 1982), 10 pgs.

"Japanese Application No. 2006-524892, office Action mailed Jan. 5, 2010", 6 pgs.

"Japanese Application No. 2006-524892, Office Action mailed Oct. 4, 2011", 5 pgs.

"Japanese Application Serial No. 2006-524892, Response filed Dec. 28, 2011 to Questionnaire mailed Oct. 4, 2011", 12 pgs.

* cited by examiner

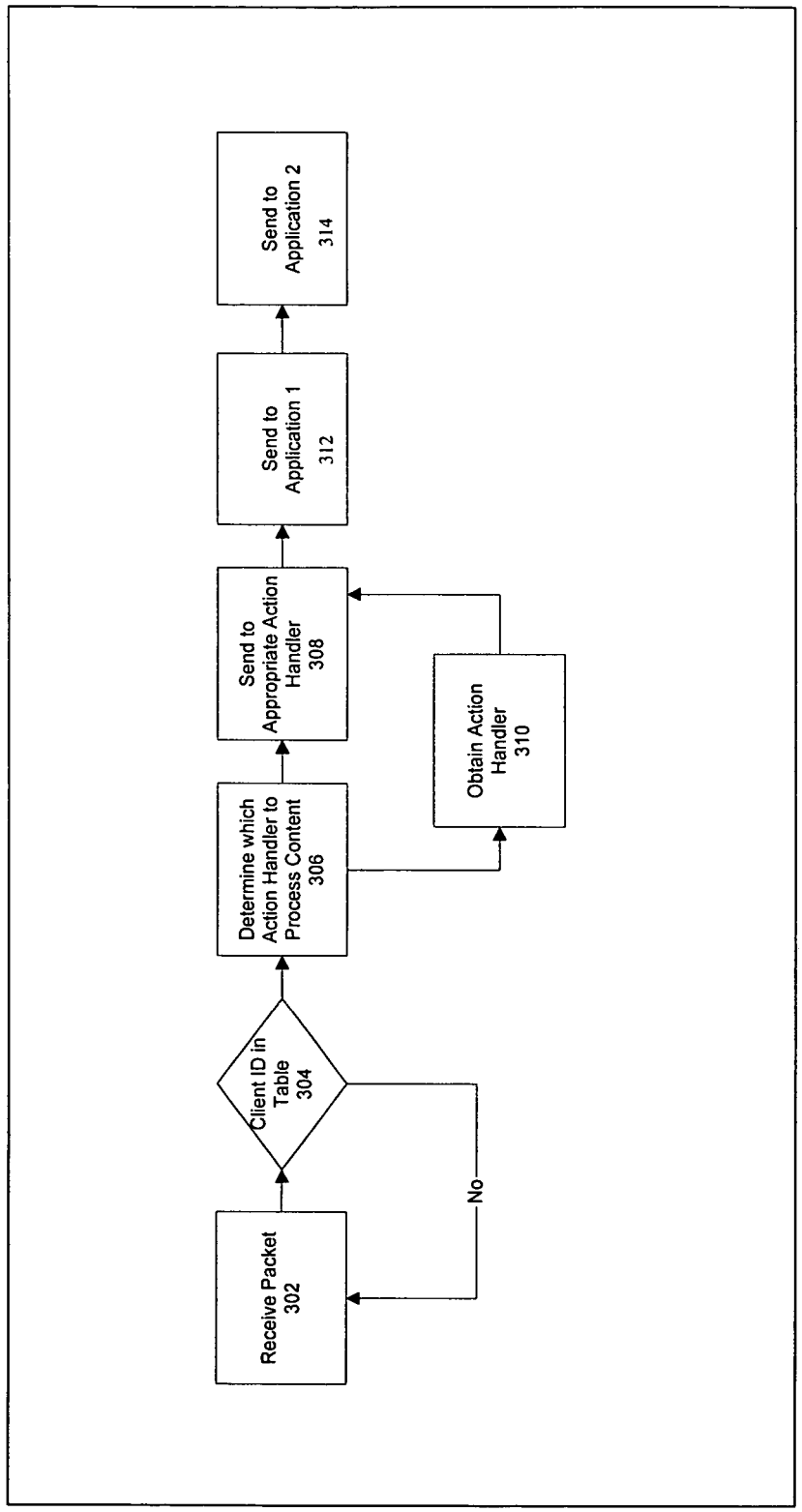

TARGETED CONTENT STREAMING AND RECEPTION SYSTEM

CROSS REFERENCE TO RELATED APPLICATION

The present application claims priority to and incorporates by reference, in its entirety, U.S. Provisional Patent application Ser. No. 60/498,575, which is entitled "Distributed Message Management System" and was filed on Aug. 29, 2003 in the name of inventor Waiman Lam, et al.

FIELD OF INVENTION

The present invention relates to the broadcast and reception of targeted content. The targeted content can be targeted to a single client or a group of clients.

BACKGROUND OF THE INVENTION

Targeted programming allows broadcasters to broadcast content to specific users. It can be used for a variety of purposes including conditioning access to certain channels, targeted advertising, and providing enhanced and interactive programming to users.

An example of a targeted programming system is a conditional access (CA) system. In a typical conditional access system, every user's set-top-box (STB) receives and conceivably views whatever is broadcast. Limitation of availability to select authorized individuals or groups is typically provided by CA mechanisms that restrict the availability of broadcast data to authorized users. An example of a CA mechanism is described in U.S. Pat. No. 6,157,719 to Anthony Wasilewski, et al. However, CA systems generally require additional hardware and are not particularly well-suited for targeting a variety of different types of content to users. For instance, while CA systems can send conditional access to programming, they are generally unable to send applications or updates to individual users. Further, the programming is typically targeted to a single STB ID and there is usually no way for a group of STB to be programmed simultaneously.

Accordingly, a need exists for a more flexible system that can send a variety of targeted content. A need also exists for a system with that can send targeted content groups of individual users simultaneously.

SUMMARY OF THE INVENTION

This invention relates to methods and systems for the broadcast and reception of targeted content. The targeted content can be targeted to a single client or a group of clients.

One embodiment is a method for distributing content to targeted clients in a broadcast stream. The method includes determining an action handler for processing targeted content. The method also include preparing a packet that includes content, a client identifier that identifies one or more targeted clients, and an identification of a content type and distributing the packeted content in a broadcast stream to a plurality of client systems.

Preferably, the client identifier identifies a single client system or a group of client systems. Preferably, the client identifier is a bitmap address that identifies a plurality of client systems. Preferably, the action handler populates a database on a client system or runs an application. A favored application is a message application that displays a message on a client system. Preferably, the content type is a multi-layer identifier. Preferably, the packeted content is distributed at a predetermined rate.

Another embodiment is a method for receiving targeted content in a broadcast stream. The method includes receiving at a client receiver a broadcast stream that includes packeted content. The packeted content includes content, a client identifier for identifying one or more client systems that are targeted for the content, and an identification of a content type. The method also includes determining whether the client receiver is targeted for the content and determining an action handler for processing the content according to the identified content type.

Preferably, the receiver determines which action handler is used to process the content by comparing the content type to a list of client types in the receiver. Preferably, the packeted content comprises an updated list of client identifiers for the receiver. Preferably, the receiver determines whether the client receiver is targeted for the content by comparing the client identifier in a packet to a list of client identifiers in the receiver. Preferably, the packeted content comprises an updated list of client identifiers.

Yet another embodiment is a method of distributing third party content to targeted clients. The method includes obtaining from a third party content and an identification of clients that are targeted for the content and determining a client receiver identification using the identification of clients that are targeted for the content. The client receiver identification can be used by a client receiver to determine if the client is targeted for the content. The method also includes packeting the content with client receiver identification and distributing the packeted content in a broadcast stream.

Another embodiment is a method of distributing content to targeted clients. The method includes obtaining content and a client identifier that identifies one or more targeted clients, preparing a packet comprising the content, client identifier and a targeted packet identifier and distributing the packet in a broadcast stream a plurality of times. The rate of distribution or the number of times a packet is distributed is determined according to a priority of the packet.

Yet another embodiment is a receiving system for receiving targeted content in a broadcast stream. The receiving system includes a targeted content receiving layer capable of receiving packeted content and filtering the content to determine whether the receiver is a target for the content; and an application layer for receiving content from the targeted content receiving layer when the receiver is a target for the content.

Another embodiment is a computer readable medium containing program instructions that are executable to receive packeted content that includes a client identifier for identifying one or more clients that are targeted for the content, and identification of a content type. The programming instructions are also executable to determine whether a client receiver is targeted for the content and process the content according to the identified content type.

Another embodiment is a targeted content system that includes a content provider and a targeted content server that receives content from the content provider. The content provider provides content that is to be targeted to one or more specific client and the content provider packets the content with a client identifier that identifies one or more targeted clients, and an identification of a content type.

Another embodiment is a targeted content system that includes a targeted content server and a queuing system. The targeted content server packets the content with a client identifier that identifies one or more targeted clients, and an identification of a content type and queuing system accepts the packeted content and inserts the packeted content into a broadcast stream.

BRIEF DESCRIPTION OF THE DRAWINGS

The invention will be better understood by reference to the Detailed Description of the Invention when taken together with the attached Figures, wherein:

FIG. 3 is a flowchart of the basic operation of the targeted content extension.

DETAILED DESCRIPTION OF THE INVENTION

Described are methods and systems for distributing and receiving targeted content in a broadcast stream. In addition, packets useful in distributing the content in a broadcast stream are described.

There are many scenarios where applications or services, content providers or merchants, commercial third parties and network operators desire to send content to a client system. Such content can include notifications of an event or change of status. Examples include: new Email or Instant Message received alerts; targeted or requested News or Information updates (Stock updates, Scores or Breaking News, etc.); reminders or prompts to view a broadcast and targeted advertisements.

The targeted content system allows content to be sent to client receivers through a broadcast medium that does not require the receiver to have a backchannel. Further, it allows for the receiver to directly communicate back to the broadcaster, and does not need to be dependent on which channel the client is viewing. The system can broadcast content to individuals or groups without disrupting the current broadcast content or causing the user to (immediately) tune away from what he is viewing. The system can also be used to manage the configuration of receivers in a network.

Figure 1:
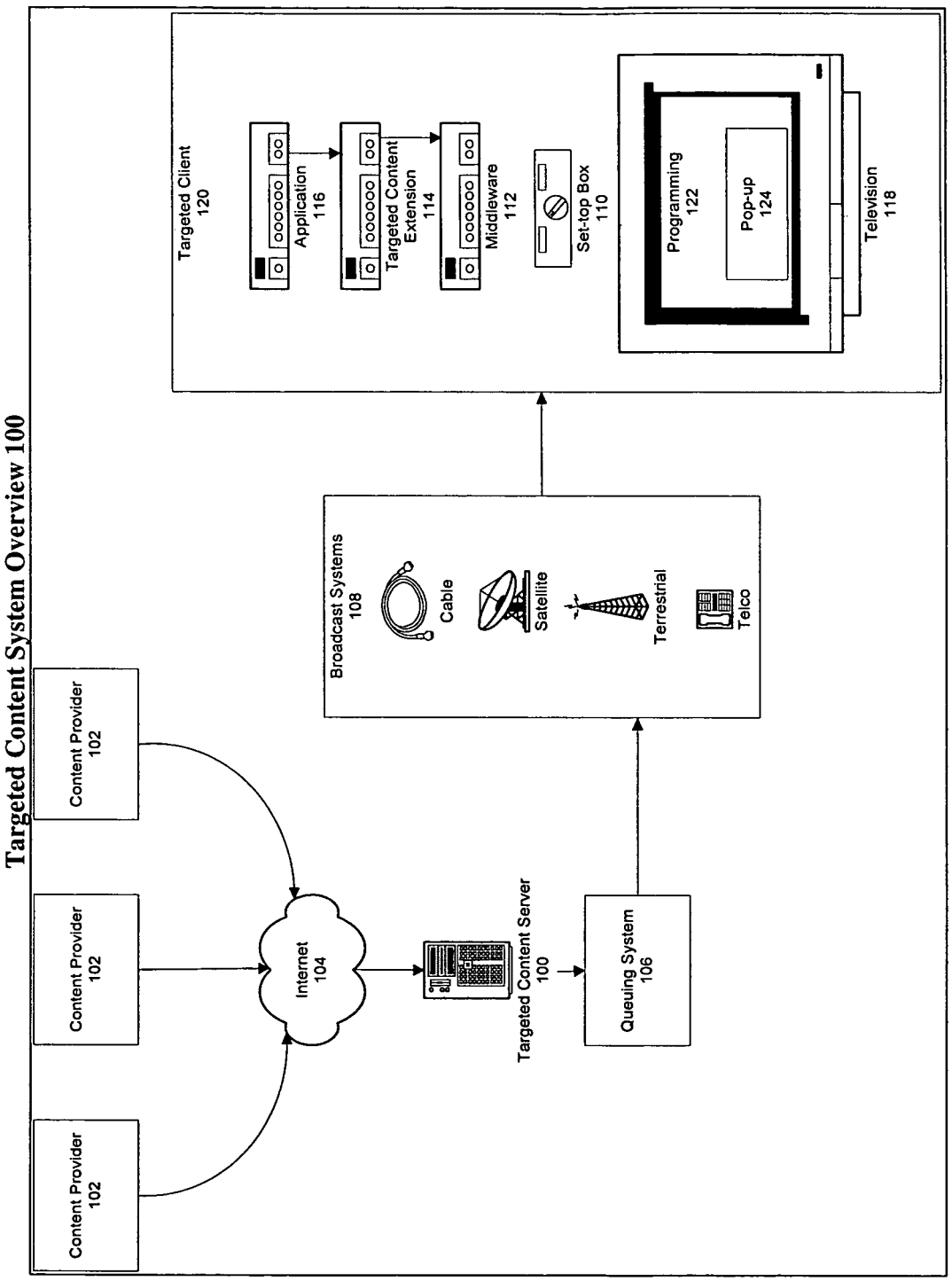
FIG. 1 is an overview of one embodiment of the targeted content system.

FIG. 1 shows one embodiment of the targeted content system. In FIG. 1, a targeted content server 100 is configured to receive content from one or more content providers 102. The content providers 102 can be connected to the targeted content server, for example, by use of an Internet, Ethernet or any other transmission means or network known in the art 104. An Internet connection 104 allows content providers 102 to be situated away from the targeted content server 100. This configuration can be useful, for example, for configurations in which the content provider 102 is a third party who wishes to use the targeted message system to distribute content to clients 120.

Alternatively, content provider 102 may be local to the targeted content server 100, or the targeted content server may generate targeted content on its own without a targeted content provider.

Once the targeted content server 100 receives the content from content provider 102, the targeted content server 100 identifies clients 120 that should receive the targeted content. This determination can be made by either the targeted content provider 102 or the targeted content server 100. Targeted clients can include, for example, an individual set-top box 110, all set-top boxes in a household, all clients in a certain area or with certain characteristics, or even all clients of a broadcast system 108.

The content and the identification of clients that should receive the targeted content are packaged into data packets together and sent to queuing system 106. Queuing system 106 determines the data rate that the packeted content should be sent to targeted client 120. The rate that the packeted content is sent can depend on any number of choices including the priority of content, the date and time of the content amongst other things. The queuing system 106 then sends the packeted content to broadcast system 108, which distributes the packeted content to clients using a broadcast signal. Preferred broadcast systems 108 can include cable, satellite, terrestrial, Internet, telephone systems or any other conventional broadcast system. The broadcast signal can be analog or digital. For capacity reasons, preferably the broadcast signal is digital. Preferably, the broadcast system 108 distributes the packeted content concurrently with normally scheduled programming. Alternatively, it could be sent at other times.

The targeted client system 120 can be any system configured to receive a broadcast signal. In FIG. 1, client system 120 is a television system. Client systems may include wired and wireless PC devices, digital televisions, analog televisions, PDAs, web tablets, digital radios, analog radios, cell phones, and any combination of the foregoing devices.

In FIG. 1, client system 120 includes set-top box 110 and television 118 connected to set-top box 110. Set-top box 110 includes software and hardware 112, 114 and 116 for receiving and implementing the packeted content. Set-top box 110 receives the broadcast signal from broadcast system 118 and demodulates, decompresses and/or decodes according to processes well know in the art.

Middleware 112 in set-top box 110 is connected to targeted content extension 114 and allows targeted content extension 114 to communicate with the rest of the client system 120. Middleware is software that manages the communication between different applications in the receiver. The middleware allows the same applications to be run on different receivers having different computing platforms. Targeted content extension 114 receives targeted content packets and determines whether the client system 120 is a target of the targeted content. Targeted content extension 114 is able to determine which packets are meant for the client system by looking for specific client identifiers in the targeted content. If the targeted content extension 114 determines that the targeted content is meant for client system 120, the targeted content extension 114 takes steps to implement the targeted content. The targeted content can include a wide variety of data including updates to client system 120, configuration data, tables, messages and programs for client system 120.

Application 116 is linked to targeted content extension 114. Targeted content extension 114 can pass off targeted content meant for client system 120 for implementation. In FIG. 1, the targeted content is a message to client system 120. Application 116 in this example is a pop-up message application that displays pop-up 124 containing the targeted content over regularly scheduled programming 122 television 118. The regularly scheduled programming is preferably received concurrently with the targeted content.

Targeted Content Server System

The targeted content server system includes all components for preparing a targeted content packet and broadcasting the targeted content to one or more client systems. The targeted content server system can include a content provider application, for receiving content from a content provider, a targeted content server for preparing the targeted content packet; and a queuing system for distributing the targeted content at predetermined times in a broadcast stream.

Figure 2:
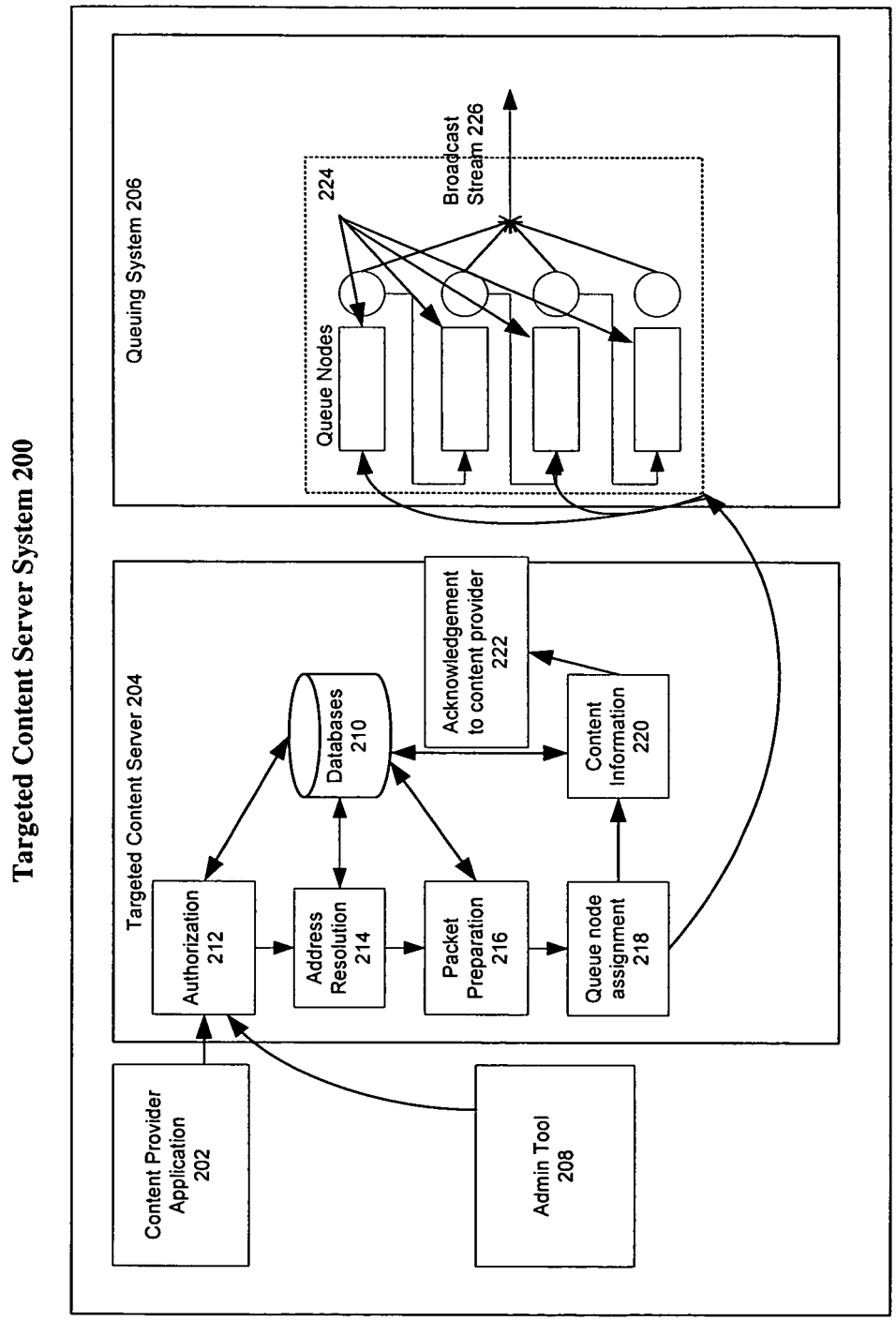
FIG. 2 is an example of one embodiment of the targeted content server system.

FIG. 2 shows one embodiment of a targeted content server system. In FIG. 2, a targeted content server 204 is connected to one or more content provider applications 202 that provide content to be distributed to one or more client systems. Targeted content server 204 packets this content with such information as a client identifier, a targeted packet identifier and a content identifier. Administrative tools 208 can be used to update the targeted content server 204 and to generate content such as system messages and data to be distributed to client systems. Queuing system 206 accepts the targeted content packets and preferably inserts them at predetermined times into a broadcast stream that is received by a plurality of client systems. The targeted content server system can assign a quality of service (QOS) to each targeted packet. The quality of service defines the repetition rate (the number of times the packet is sent per unit of time) of the packet. The quality of service of the packet can be varied according to the importance of the packet.

The targeted content server 204 generates the targeted content packets. The packet content can be received from a content provider application 202 or generated by the content server 204 itself. During the packet generation process, the targeted content server 204 can access a databases 210 to determine client identifiers to address the packet to specific client systems.

The targeted content server 204 can include a single processor or multiple processing elements. The term processing element may refer to (1) a process running on a particular piece, or across particular pieces, of processing hardware, (2) a particular piece of processing hardware, or either (1) or (2) as the context allows. Each processing element can be supported via a standard general purpose processor such as an Intel-compatible processor platform preferably using at least one PENTIUM III, PENTIUM IV or CELERON, PENTIUM, XEON, ITANIUM (Intel Corp., Santa Clara, Calif.) class processor; alternative processors such as MIPS (MIPS Technologies, Mountain View, Calif.) or UltraSPARC (Sun Microsystems, Palo Alto, Calif.) could be used in other embodiments, as well as other microprocessors which are well known in the art. The server processor can include one or more field programmable gate arrays (FPGAs) and/or application specific integrated circuits (ASICs) configured to perform at least a portion of the functionality according to the present invention. In other embodiments, an embedded microprocessor can be used such as, but not limited to, an ARM (ARM, Carlsbad, Calif.) processor core.

In some embodiments, the system processor can include a combination of general purpose processors, ASICs and/or FPGAs. In some embodiments functionality can be distributed across multiple processing elements. In some such embodiments, aspects of the functionality or portions thereof may be executed in series or in parallel; particular functionality or portions thereof executed a multiplicity of times may also occur in series or parallel.

In a system processor including at least one general purpose processor, the general purpose processor typically runs an appropriate operating system such as, but not limited to, WINDOWS/NT, WINDOWS 2000 or WINDOWS/XP (Microsoft, Redmond, Wash.), IRIX (Silicon Graphics, Mountain View, Calif.), Solaris SOLARIS (Sun Microsystems, Palo Alto, Calif.), or LINUX (or other UNIX variant). This component runs preferably on Windows 2000.

The targeted content server can include authorization module 212. Authorization module 212 provides access to content provider applications 202 and contains information such as passwords and content identifiers for indicating which action handlers (the module in the client system that processes the content) should be used by the client system to process the content. It also provides the content categories with content from the provider. Targeted content server 204 can use this information to limit access to provider applications (for example certain providers may have access to send content to only specific client systems), determine the quality of service (how often the content should be sent in the broadcast stream) using queuing system 206 and determine how to label incoming packets with the appropriate content identifiers.

Once a message is received from a content provider application 202, the targeted content server can look up the client identifiers that should be assigned to the content using address resolution module 214. A content provider application 202 can provide content with a provider content identifier. For example, an email application may provide a client's email address to identify a client. The targeted content server can then use address resolution module 214 to determine the client identifier to be used to deliver the content to the correct client system. If the identifiers can be found, the process continues, otherwise an error can be returned to the content provider application 202. The address resolution module 214 can also verify whether the application has permission to send content to the client system, which prevents spamming.

By allowing a content provider application to refer to a client using their own identifier the system allows the targeted content server 204 to integrate more easily with content provider applications 202.

Once the content identifiers and client identifiers are determined, targeted content server 204 prepares a targeted content packet that contains all relevant information about the message at 216. The packet can contain, for example, a client identifier, a content identification, an expiration date, etc.

After the packet is prepared at 216, the targeted content server 204 then assigns the message(s) to an appropriate quality of service (QOS) at 218. QOS describes how the queuing system 206 should handle the message including the repetition rate used to send the content. A packet with a high quality of service is preferably sent at a higher repetition rate than packets with a lower quality of service. The quality of service can change over time. For example, the repetition rate can decrease over time.

Preferably, information about the content is logged at 220. Content information can include when the content was received, when the content expires and the size of the content. The parameters can also include when the content was removed, the number of times the content was sent, etc. This data can be used for a variety of purposes including billing and auditing purposes.

Once the message has been delivered to the queuing system 206, the targeted content server 204 can return a request identification and output message count (number of generated messages) to the content provider application 202 at 222. The content provider application 222 can use the request identification to cancel the messages at a later time.

A message can be removed from the system either when the message's lifetime has expired or when the targeted content server 204 receives a cancel command from content provider application 202.

The queuing system 206 manages and plays a carousel containing all the targeted content packets. A carousel is an ordered list of targeted content packets. Upon receiving the calls from the targeted content server 204, the queuing system 206 creates the appropriate queue nodes 224 for each targeted content packet.

Each queue node 224 inserts the targeted content packet into a broadcast stream according to its QOS. The QOS can include the following parameters: output bit rate (how much bandwidth in the broadcast stream the targeted content packet is allocated), message lifetime (the length of time the targeted content packet should be broadcasted) and the repetition rate (how often the packet should be sent).

The repetition rate of a targeted content packet can be constant for a period of time or variable. For example, a message may be sent twenty times during the first hour, ten times during the second hour and none during the third hour. It can be recognized that any variation in repetition rate can be obtained.

Different repetition rates can be obtained with different queue nodes. For example, a certain queue may be configured to send a targeted content packet X number of times. To decrease the number of times the content is sent, the content moves to the next queue that has a lower repeated rate. The content can stay in the last queue until its lifetime expires.

Preferably, the queue nodes 224 package content with the same client identifiers together to reduce the number of messages being sent.

The nodes can insert the targeted content packets into a variety of broadcast streams 226 using any number of different formats. For example, the targeted content packets can be formatted into MPEG-2 private sections and MPEG-2 transport packets. MPEG compression is a set of methods for compression and decompression of full motion video images that uses interframe and intraframe compression techniques.

Multiple private sections can be packed together within a transport packet to further reduce the bandwidth usage. Null packets will be sent to fulfill the output bandwidth requirement if the system is underflow. It will also be recognized that the packets can be broadcast using a number of other digital and analog formats. For example, the packets could be inserted into the vertical blanking interval (VBI) of an analog broadcast stream, the horizontal blanking interval, secondary audio channels, SAP, etc.

Administration Tool 208 allows a network operator to configure and monitor the targeted content server system 200. Further, provides the capability to create and provide network and system content to client systems. For example, a network operator can use targeted content system 200 to send targeted messages to client systems, configure tables in the client system and send content for obtaining applications.

System configuration tables are used by client systems to determine how to handle incoming targeted content packets (For example, which type of action handler to use for a given content). The tables can be broadcast continuously with a broadcast identifier to all receivers or targeted to individual receivers (for example, a table containing the client identifiers for a particular receiver may be broadcast to a single receiver).

Targeted Packet

Targeted packet refers to a collection of related data. Targeted packets are preferably transmitted together or in a serial fashion on a broadcast stream The packet preferably includes a client identifier. The client identifiers can identify, for example, a single receiver, a single user signed into the receiver, a set of receivers in a household, a group of receivers or even all receivers capable of receiving and processing the broadcast packets.

For example, the client identifier may be unique to a specific client system. Identifiers of this type may include an identifier unique to a receiver (such as a set top box), an identifier that is unique to a smart card within the receiver, or a client's account number programmed into the receiver. This type of identifier can be attached to content that is meant only for a specific client system.

Multiple receivers can be set to belong to a single group. An example of a group client identifier is a zip code. Once a receiver is registered by including the group identifier for a specific zip code in a filter in the receiver, the receiver can receive all content addressed to that zip code. Other examples of a group identifier include users of a certain demographic, users who desire certain information content (for example, stock or sports news) and a wide variety of other groups that can include one or more users and/or receivers. A group client identifier allows a single message to be sent to all receivers belonging to the same group. This type of addressing saves bandwidth compared to individual addressing. It also has the effect of improving the real-time behavior by reducing the latency between the time a new message enters the system and the time it is sent over the air.

Bitmap addressing can also be used as a group identifier. For example, the last 8 bits of an individual receiver address can be ignored and replaced with a 256 bit bitmap (32 bytes). Receivers are then addressed when their individual bit in the bitmap is set. This addressing mode allows up to 256 receivers to be addressed with a single message, and is more efficient than individual messages.

The targeted content extension can also look for broadcast addressing in which no address is used, as a single message that is sent to all receivers.

The client identifier can be any length. In addition, the length of the client identifier may be adjustable. The actual client identifier length could be a separate field in the packet or part of the content of a single packet. In this manner, if a network does not use all bytes set aside for the client identifier it can reduce the length of the client identifier number by notifying the targeted content extension of the actual client identifier length. Reducing the size of the client identifier can increase system performance by decreasing the filtering time at the receiver. Increasing the size of this field increases the number of different content packets that can be identified concurrently.

Preferably, the packet includes a targeted packet identifier that identifies the packet. All packets with this identifier will contain the same targeted packet identifiers. The targeted packet identifier allows a receiver to determine if the content has already been received and processed, preventing duplication.

The packet preferably also includes a multi-layer content type identifier. In one embodiment, the content type identifier is divided into a main category and a subcategory content identifier. Main content type identifiers can include, for example whether the content is system content, network content or application content.

System content can include, for example, content for populating and updating tables and data relating to the client system. This content may be used by the system for updating which client identifiers should be accepted, which action handler should be used to process a certain type of content, updates to software within the system etc. Network content can include, for example, program related content related to programming schedules and which networks the client is authorized to view. Application content can relate to content that is used to run a program on the client's system. An example of this type of content can include, for example, messages to be sent and viewed on a client's system.

The subcategories can more specifically detail the contents of the packet. For example, what type of table is included, a message type etc. Together the main and sub-content type can be used by the targeted content extension to determine which type of action handler should be used to process the content.

In addition, preferably the expiration date of the content packet is included in the packet. The expiration date also prevents the continual processing of the same packet repeatedly. For example, a packet with an expiration date of 20 minutes will indicate to the receiver that the packet once it is processed should not be processed again for 20 minutes. The receiver will ignore messages with the same targeted packet identifier. If the content is a message, the expiration date can be used to prevent the client system from displaying the message continually. Instead, the message will only be once in this 20 minutes.

The data packet can also include information for returning a content received message back to the sender. This field could include an internet address or other identifier to be used to contact the sender so that the sender will cease sending the message to the client. This field can be used if the client system includes a backchannel that allows communication back to the content sender.

Finally, a private data field can also be included. The private data field can include any other information, such as more specific parameters for handling the message.

Content

The content can comprise a wide variety of data. Some preferred data types include table content, message content and application content. Application content can include messages.

Table content is content that is sent to a client system or a group of client systems to populate a table or other data store in the client receiver. Examples of table content can include one or more client identifiers that are to be used to populate a list within a client receiver. For example, a client receiver may include a preset receiver client identifier. A data packet containing this receiver client identifier can be sent to the receiver with a table of additional client identifiers that the receiver should accept. The data or tables can also be used to configure a variety of programs within the receiver or a client system attached to the receiver.

Message content is content that includes messages, notification, or alerts that are sent to a user of a client system. Preferred messages can include new email or instant message received alerts; targeted or requested news or information updates (stock updates, scores or breaking news, etc.), reminders or prompts to view a broadcast and targeted advertising messages. This type of content may utilize one or more programs within the receiver to display the messages to the viewer.

Download application content is content that includes information for obtaining a program that is to be utilized by the receiver. This content may include information on how the client system can download the application (for example by using an internet connection) or the content may even include the program.

Receiver

The receiver is capable of receiving a broadcast signal. A preferred receiver is capable of receiving a digital or analog television signal. The receiver may also include, but does not require, a backchannel. A backchannel is a communications pathway in which the receiver is able to send information to other systems outside the client system. Such a pathway may include a standard POTS (plain old telephone system) phone line and associated modems. The backchannel may also include a coaxial cable, fiber optic cable, DSL (Digital Subscriber Line), ATM (Asynchronous Transfer Mode) or other communication lines both wired and wireless.

Targeted Content Extension

The targeted content extension listens for packeted content in a broadcast signal received by the receiver. Preferably, the targeted content extension listens to all channels of the broadcast, so that no matter what the end user is viewing or listening to, a packet can be identified and processed as soon as possible. The targeted content extension filters the packeted content to determine whether the packeted content is content that is targeted for the client system and, therefore, needs to be further processed. The filtering can be hardware filtering (for example a filter can be in the demultiplexer hardware), software, or both. This filtering preferably can be turned off if the client system user does not wish to obtain any targeted content.

Preferably, the targeted content extension includes a table or other data structure that includes all client identifiers assigned to the client. The targeted content extension filters incoming content looking for the client identifiers in the table. If the incoming content includes a client identifier in the table, the content is further processed. As previously described, the client identifiers can be configured to address a single receiver, a group of receivers or even all receivers that receive a broadcast stream.

In addition, a more specific client identifier can also be used. For example, certain applications may need a better addressing mechanism than just the receiver. For instance, an e-mail application is likely to allow multiple users for a single set-top box. Since it is difficult to provide a standard mechanism for all possible applications, the targeted content extension may leave additional addressing up to each application. For each application, the content may provide additional address information that depends on the content identifier space or private data field space, e.g. the e-mail application may use a 'To:' field to identify the e-mail recipient.

Preferably, the targeted content extension includes a table or other database that specifies what action handler should be used to process a specified content. An action handler can be an application or other program that takes the appropriate action for the received content. A preferred action handler can configure the receiver. Configuration can include filling in tables or other databases with user specific information. The targeted content extension or other programs within the receiver (for example, the receiver's middleware) can use this information.

Another preferred action handler can control the receiver. Control can include, for example, changing the channel of the receiver. Yet another preferred action handler can control components of the receiver, for example the middleware program or other software in the receiver. Finally, another preferred action handler can run a message or interactive program. Favored interactive programs can display messages to the user and prompt the user if they want to take some action (such as run another application).

The table that lists the appropriate action handlers and other tables and databases utilized for by the targeted content extension are preferably obtained and/or updated using packeted content. Tables and databases used by other programs in the receiver can also be updated and/or obtained in this manner.

The targeted content extension can look up the content main category and subcategory in the packeted content to determine which action handler should be used. This table can also include where the action handler can be found (if the action handler needed to handle a specific content is not on the system, the table can include where the handler can be downloaded or otherwise obtained) and what parameters are used to activate the action handler. In an alternative embodiment, the information used for finding and running the action handler for a particular content packet is sent with the packet.

A preferred application displays messages (such as notification and alerts) on a client system. Message applications can display the contents of a packet in a variety of ways. For example, the messages may be conveyed visually or audibly using the client system. A message may be displayed on a video display or on a receiver/set top box. Alternatively, or in addition, the client system may utilize audio signals to notify a user of the client system.

In a television environment a preferred application is a pop-up message system. The popup message system displays messages to a user in a window that overlays normal broadcast programming.

After receiving a message the application may prompt the user for a response. For example, the system may notify a user that they have email or an instant message waiting and prompt the user if they wish to launch an email or instant message program to view their email or instant message.

Preferably, the targeted content extension records information on incoming content. This information can include the content identification that identifies the content packet. In addition, preferably the expiration date of the content packet is recorded to prevent processing the same packet again in its lifecycle.

FIG. 3 is a flowchart of the basic operation of the targeted content extension 300. In FIG. 3, packeted content is delivered to the targeted content extension at 302. Hardware in the receiver, a middleware program or the targeted extension itself can parse out the packeted content from regularly scheduled programming of a broadcast stream.

The targeted content extension 300 then compares the client identification of the packeted content to a table of client identifiers at 304. If the client identifier in the message matches an accepted client identifier in the table, the packeted content proceeds to 306, otherwise the targeted content is discarded and the targeted content extension returns to 302 to await the arrival of the next targeted packet.

At 306 the content category from the packeted content is found in a table. The table lists the appropriate action handler for the content category. In addition, the table can list the parameters that need to be provided to the action handler for handling the contents of the packet and where on the system the action handler can be found.

If the action handler is not on the system, the table can list where it can be obtained. The system at 310 can then go and download (or otherwise obtain) the appropriate action handler.

If the action handler is on the system, the targeted content extension hands the content and any parameters to the appropriate action handler for processing the contents of the targeted packet at 308. The action handler can take an appropriate action, for example running a first interactive application 312, to display a message to the user that they have received a new email. In response to a client reply to the message, the first application 312 may activate a second application 314, which can be, for example, an email program.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

Other embodiments and uses of the invention will be apparent to those skilled in the art from consideration of the specification and practice of the invention disclosed herein. All references cited herein, including all U.S. and foreign patents, patent applications, all publications and other documentary materials, are specifically and entirely hereby incorporated by reference.

The invention claimed is:

1. A method of receiving targeted content in a content stream, the method comprising:
maintaining at least one table at a client system, the at least one table storing;
a list of client identifiers including a preset receiver client identifier of the client system and additional client assigned to the client system;
an identification of an action handler for processing the content,
a location where the action handler is located in the client system,
a location where the action handler is obtainable from based on the action handler being located on a remote system, and
a parameter to be provided to the action handler and used to activate the action handler;
receiving, at a client receiver of the client system, a content stream that comprises packeted content, the packeted content comprising content, a client identifier that identifies one or more client systems that are targeted for the content, and a content category;
determining, using a processor, whether the client system is targeted for the content by comparing the client identifier in the received packeted content to the list of client identifiers stored in the at least one table of the client system for a match;
in response to the determining that the client system is targeted, searching the at least one table for the action handler corresponding to the content category in the packeted content and determining the action handler for processing the content;
obtaining the action handler from the location indicated in the at least one table; and
providing the content and the parameter identified from the at least one table to the action handler to cause the action handler to perform an action.

2. The method of claim 1, wherein the client receiver determines which action handler is used to process the content by comparing the content category to a list of client types.

3. The method of claim 2, wherein the packeted content comprises an updated list of client identifiers for the client receiver, the updated list of client identifiers used to update the list of client identifiers stored in the at least one table.

4. The method of claim 1, wherein the packeted content comprises an updated list of client identifiers, the updated list of client identifiers used to update the list of client identifiers stored in the at least one table.

5. The method of claim 1, wherein the client identifier identifies a single client system.

6. The method of claim 1, wherein the client identifier identifies a group of client systems.

7. The method of claim 1, wherein the client identifier is a bitmap address that identities a plurality of client systems.

8. The method of claim 1, wherein the action handler populates a database on the client system.

9. The method of claim 1, wherein the action handler runs an application.

10. The method of claim 9, wherein the application is a message application that displays a message on the client system.

11. The method of claim 1, wherein the content category is a multi-layer identifier.

12. The method of claim 1, wherein the packet comprises additional address information that depends on content identifier space or private data field space.

13. A non-transitory machine-readable storage medium tangibly storing program instructions that, when executed by a processor of a machine, cause the machine to perform operations comprising:
maintaining at least one table at a client system, the at least one table storing:
a list of client identifiers including a preset receiver client identifier of the client system and additional client identifiers assigned to the client system;
an identification of an action handler for processing the content,
a location where the action handler is located in the client system,
a location where the action handler is obtainable from based on the action handler being located on a remote system, and
a parameter to be provided to the action handler and used to activate the action handler;
receiving, at a client receiver of the client system, a content stream that comprises packeted content, the packeted content comprising content, a client identifier that identifies one or more client systems that are targeted for the content, and a content category;
determining whether the client system is targeted for the content by comparing the client identifier in the received packeted content to the list of client identifiers stored in the at least one table of the client system for a match;
in response to the determining that the client system is targeted, searching the at least one table for the action handler corresponding to the content category in the packeted content and determining the action handler for processing the content;
obtaining the action handler from the location indicated in the at least one table; and
providing the content and the parameter identified from the at least one table to the action handler to cause the action handler to perform an action.

14. A receiving system for receiving targeted content in a content stream, the receiving system comprising:
at least one processor coupled to a memory;
a first module to maintain at least one table at a client system, the at least one table storing:
a list of client identifiers including a preset receiver client identifier of the client system and additional client identifiers assigned to the client system;
an identification of an action handler for processing the content,
a location where the action handler is located in the client system,
a location where the action handler is obtainable from based on the action handler being located on a remote system, and
a parameter to be provided to the action handler and used to activate the action handler;
a second module to receive, at a client receiver of the client system and using the at least one processor, a content stream that comprises packeted content, the packeted content comprising content, a client identifier that identifies one or more client systems that are targeted for the content, and a content category;
a third module to determine, using the at least one processor, whether the client system is targeted for the content by comparing the client identifier in the received packeted content to the list of client identifiers in the at least one table of the client system for a match;
a fourth module to, in response to the determining that the client system is targeted, search the at least one table for the action handler corresponding to the content category in the packeted content and to determine the action handler for processing the content;
a fifth module to obtain the action handler from the location indicated in the at least one table; and
a sixth module to provide the content and the parameter identified from the at least one table to the action handler to cause the action handler to perform an action.

* * * * *

UNITED STATES PATENT AND TRADEMARK OFFICE
CERTIFICATE OF CORRECTION

| | | |
|---|---|---|
| PATENT NO. | : 9,143,248 B2 | Page 1 of 1 |
| APPLICATION NO. | : 10/928727 | |
| DATED | : September 22, 2015 | |
| INVENTOR(S) | : Benting et al. | |

It is certified that error appears in the above-identified patent and that said Letters Patent is hereby corrected as shown below:

In the claims

In column 12, line 9, in Claim 1, delete "storing;" and insert --storing:--, therefor In column 12, line 12, in Claim 1, after "client", insert --identifiers--, therefor In column 12, line 58, in Claim 7, delete "identities" and insert --identifies--, therefor Signed and Sealed this
Thirty-first Day of May, 2016

Michelle K. Lee
*Director of the United States Patent and Trademark Office*